United States Patent [19]
De Filippo

[11] Patent Number: 5,738,810
[45] Date of Patent: Apr. 14, 1998

[54] MANUFACTURING METHOD OF A MOTOR VEHICLE COMPONENT

[75] Inventor: Emilio De Filippo, Bruzolo, Italy

[73] Assignee: Gestind-M.B. Manifattura di Bruzolo SPA, Turin, Italy

[21] Appl. No.: 767,040

[22] Filed: Dec. 12, 1996

[30] Foreign Application Priority Data

Jul. 16, 1996 [IT] Italy .................. TO96A0609

[51] Int. Cl.⁶ .................. B29C 44/06; B29C 44/12
[52] U.S. Cl. .................. 264/46.7; 264/46.4; 264/46.6
[58] Field of Search .................. 264/46.4, 46.6, 264/46.7

[56] References Cited

U.S. PATENT DOCUMENTS

| | | | |
|---|---|---|---|
| 4,829,644 | 5/1989 | Kondo et al. | 264/46.6 |
| 4,873,036 | 10/1989 | Urai | 264/46.4 |
| 4,923,653 | 5/1990 | Matsuura et al. | 264/46.4 |
| 5,096,639 | 3/1992 | Hughes | 264/46.4 |
| 5,176,860 | 1/1993 | Storch | 264/46.6 |

FOREIGN PATENT DOCUMENTS

| | | | |
|---|---|---|---|
| 47-42623 | 10/1972 | Japan | 264/46.4 |
| 59-5041 | 1/1984 | Japan | 264/46.4 |
| 62-253413 | 11/1987 | Japan | 264/46.4 |
| 1-238910 | 9/1989 | Japan | 264/46.4 |

*Primary Examiner*—Allan R. Kuhns
*Attorney, Agent, or Firm*—Sughrue, Mion, Zinn, Macpeak & Seas, PLLC

[57] ABSTRACT

A method for the manufacturing of a headrest or a steering wheel or an armrest for motor vehicles comprises the steps of forming a pillow element, laying an upholstery flexible sheet onto the front surface of the pillow element, and introducing the pillow element with the flexible sheet as an insert into a foaming mould having a complementarily shaped seat. An outer body is thus foamed within the mould around the seat, so as to permanently secure the outer body simultaneously to the pillow element and to the perimetral edge of the flexible sheet.

5 Claims, 3 Drawing Sheets

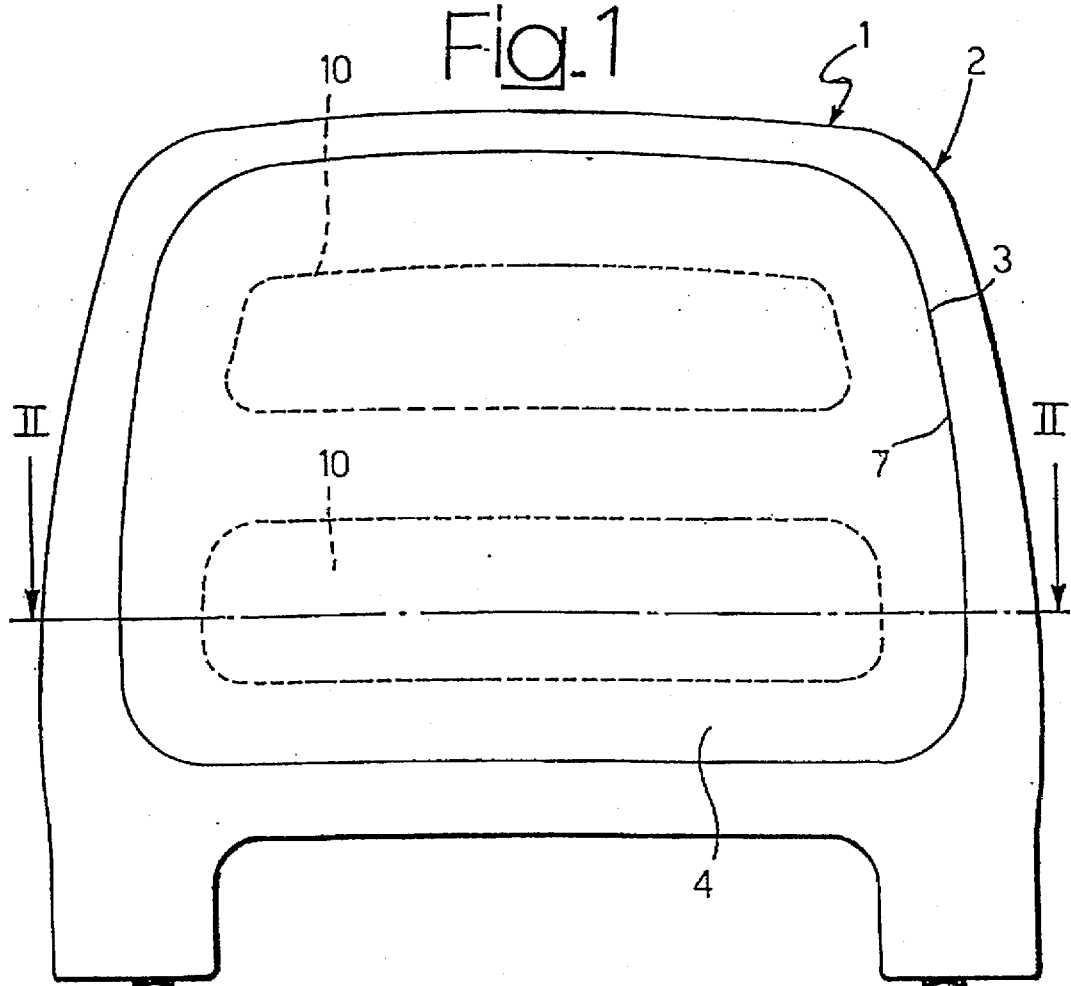
Fig_1
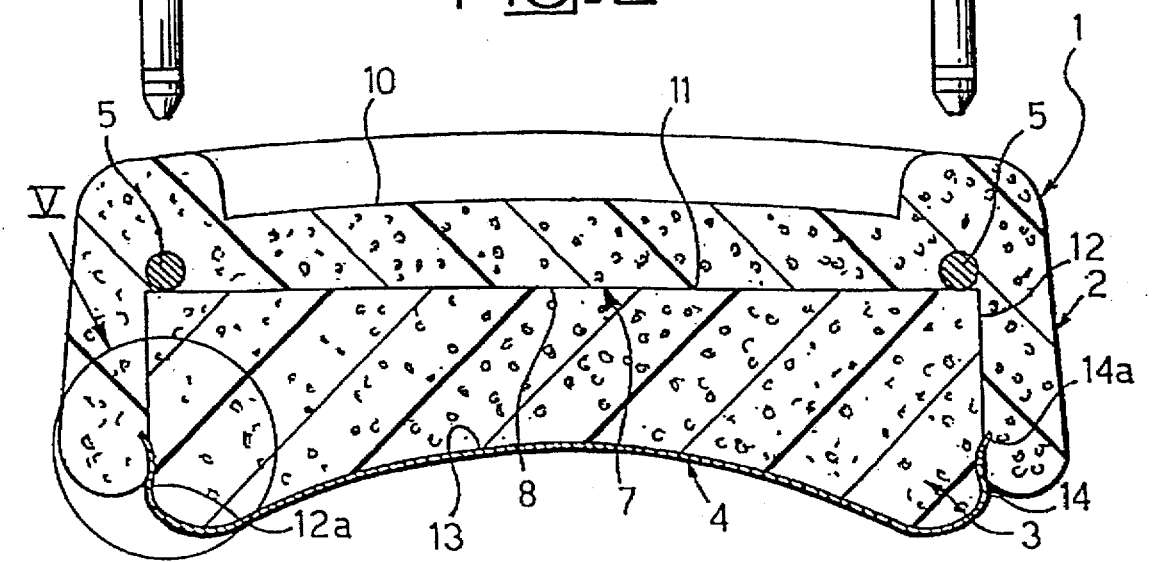
Fig_2

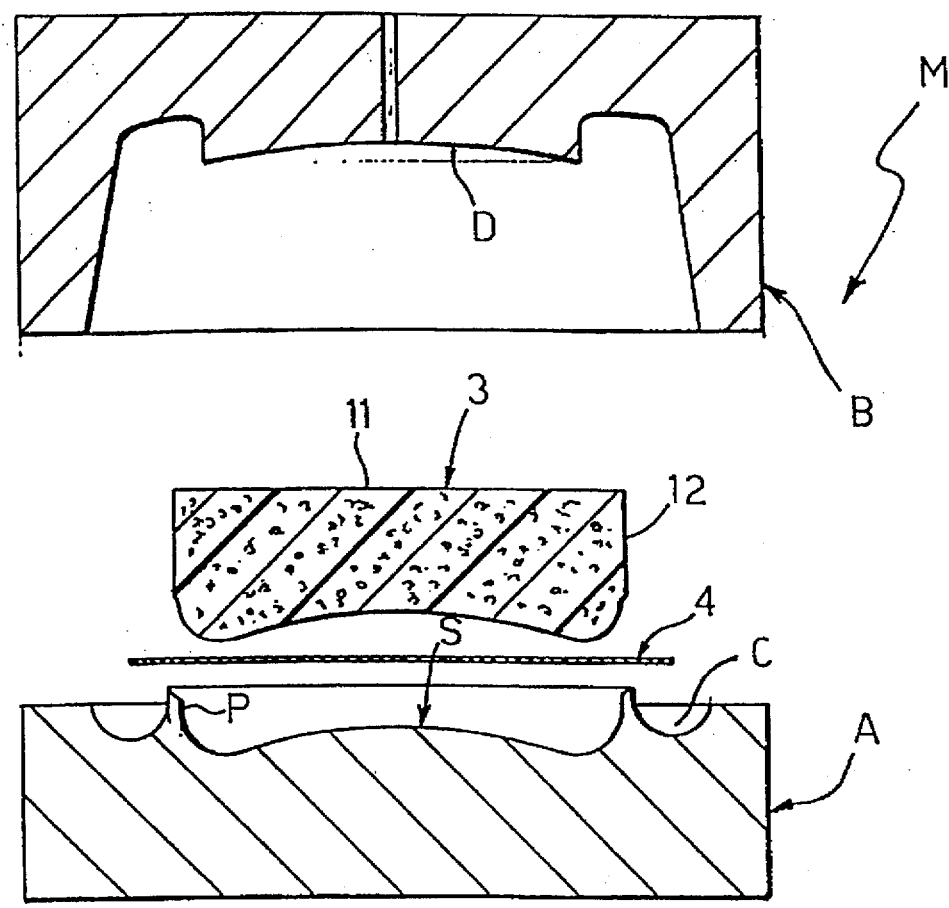
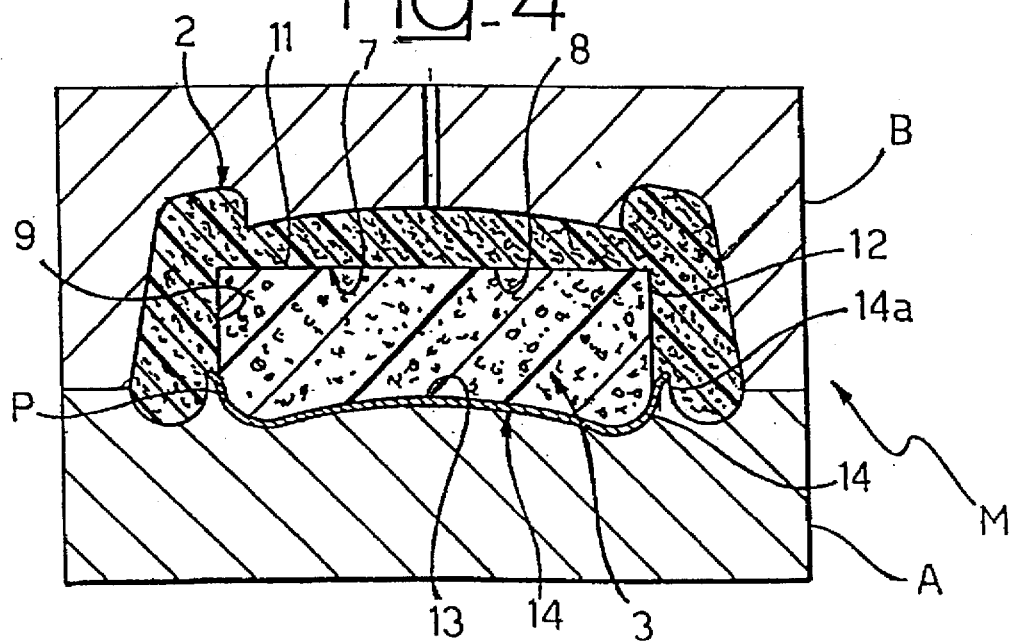

MANUFACTURING METHOD OF A MOTOR VEHICLE COMPONENT

BACKGROUND OF THE INVENTION

The present invention is related to a method for the manufacturing of a motor vehicle component comprising an outer body formed by in-mould foaming of a relatively soft plastic material and having a front recess, an inner pillow element made of moulded plastic material and secured in correspondence of said front recess of the outer body so as to expose a front surface delimited by a peripheral lateral wall thereof, and a flexible upholstery sheet fixed on said front surface and on at least part of said peripheral lateral wall of the pillow element.

Seat headrests, as well as armrests and steering wheels having the aforesaid configuration come within the definition "motor vehicle component". In particular, with specific reference to headrests, British patent application GB-A-2.040.675 and French utility certificate FR 2.675.755 disclose mechanical assembling between the inner pillow element and the outer body, whose front recess is formed as a through, single or double, aperture designed for passage therethrough of spigot means extending from the inner pillow element and adapted to perform anchoring thereof, as stated mechanically, to the outer body. In the case of document GB-A-2.040.675 a rear filler plate is provided, which is intended to be engaged with the spigot of the pillow element for its restraint relative to the outer body, while in the case of document FR 2.675.755 two appendages of the pillow element are designed to be fitted and locked in an elastically deformable fashion into the corresponding through apertures of the outer body.

According to these known solutions the flexible upholstery sheet, which is for instance made of fabric, is secured by bonding or equivalent systems to the pillow element, prior to fixing thereof relative to the outer body.

These known solutions thus require, for the manufacturing of the headrest, at least four separate successive steps: in-mould forming of the outer body, in-mould forming of the pillow element, securing the flexible upholstery sheet onto the pillow element, and coupling the pillow element and the outer body to each other. The above steps result into relatively high manufacturing costs, particularly if related to the relatively low sale price of the finished component.

Moreover, in the mounted condition, mechanical connection between the inner pillow element and the outer body may be insufficiently reliable, with the risk of undesired separation thereof as well as of annoying vibrations and consequently noise in use.

Similar problems arise in case of armrests and steering wheels having the above-referenced configuration.

SUMMARY OF THE INVENTION

The object of the present invention is to overcome the above drawbacks, and more particularly to provide a simplified method of production of the afore-said components for motor vehicles, reducing the steps required both for the formation and for the mutual connection among the outer body, the inner pillow element and the flexible upholstery sheet.

A further object of the invention is to provide a manufacturing method through which a more safe and substantially monolithic permanent assembly between the above elements can be obtained.

According to the invention, this object is achieved by virtue of a method for the manufacturing of a motor vehicle component of the type set forth at the beginning, essentially characterized in that it comprises the following steps:

forming said pillow element, laying said flexible upholstery sheet onto said front surface of the pillow element so that the perimetral edge of said flexible sheet extends beyond said front surface of the pillow element, providing a foaming mould having a seat whose shape is complementary to that of said pillow element, and whose depth is lower than the height of said peripheral lateral wall of the pillow element, introducing said pillow element with said flexible sheet into said seat of the foaming mould, so that said flexible sheet is placed on the bottom of said seat and said lateral wall of the pillow element with said perimetral edge of the flexible sheet folded thereagainst partially project outwardly of said seat of said mould, feeding said foamed plastic material into said mould to form said outer body around said seat, so as to secure said outer body simultaneously to said pillow element and to said perimetral edge of the flexible sheet.

The outer body may incorporate a rigid framework, and as already previously explained the manufacturing method according to the invention can be applied to seat headrests as well as to armrests and steering wheels for motor vehicles.

BRIEF DESCRIPTION OF THE DRAWINGS

The invention will now be disclosed in detail with reference to the accompanying drawings, purely provided by way of non-limiting example, in which:

FIG. 1 is a diagrammatic front elevational view of a headrest for motor vehicle seats produced according to the manufacturing method of the invention, FIG. 2 is a horizontally sectioned view along line II—II of FIG. 1, FIG. 3 is a diagrammatic sectioned view depicting one step of the method according to the invention, FIG. 4 is a view similar to FIG. 3 showing a further step of the method according to the invention.

DETAILED DESCRIPTION OF THE INVENTION

Figure 5:
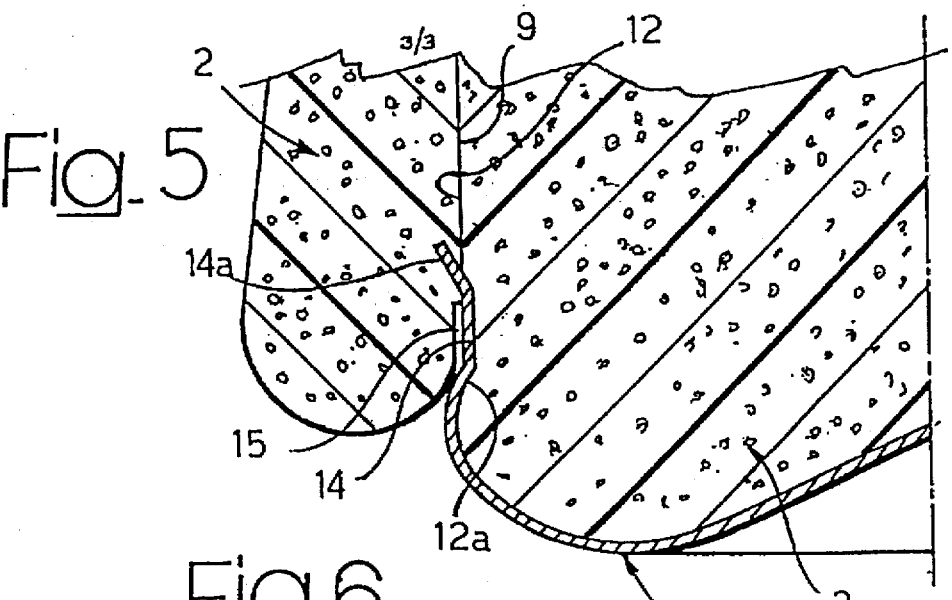
FIG. 5 shows in enlarged scale the detail indicated by arrow V in FIG. 2.

Referring initially to FIGS. 1 and 2, reference numeral 1 generally designates a headrest for motor vehicle seats, constituted by a monolithic assembly formed by an outer body 2, an inner pillow element 3 and an upholstery or lining flexible sheet 4. The outer body 2 is made of a plastic material formed by in-mould foaming, normally self-skinning polyurethane, and has therefore a relatively soft structure. A supporting metal framework 5 is incorporated within the outer body 2, which forms a pair of support rods 6 projecting beneath the body 2 for mounting of the headrest 1 on top of the backrest of a motor vehicle seat. The outer body 2 is frontally formed with a central recess 7 having a closed bottom wall 8 and a perimetral lateral wall 9 which is substantially at right angle relative to the bottom wall 8. Moreover the outer body 1 may be formed, in correspondence of its rear face, with lightening impressions 10. The inner pillow element 3 is also made of moulded plastic material, which is relatively more rigid, i.e. less soft, than the material of which the outer body 2 is made. This pillow element 3 has a shape which is complementary to that of the recess 7, with a rear wall 11 adjacent and secured to the bottom wall 8 thereof and a peripheral lateral wall 12 adjacent and secured to the perimetral wall 9. This peripheral lateral wall 12 has a perimetral portion 12a projecting outside of the recess 7, beyond the lateral wall 9, and smoothly joined to the front wall 13 of the pillow element 3, over which the flexible upholstery sheet 4 is adhering. The latter may be constituted by a synthetic fabric or the like, and has a perimetral edge 14 folded over and adhering against the projecting portion 12a of the peripheral lateral wall 12 of the pillow element 3. As shown in better detail in FIG. 5, the end border of the perimetral edge 14, shown as 14a, is incorporated within the lateral wall 9 of the recess 7 of the outer body 2, in close proximity of a perimetral gap 15 formed between the lateral wall 9 and the portion 12a of the peripheral wall 12 of the pillow element 3.

The manufacturing method of the headrest 1 will now be disclosed with particular reference to FIGS. 3 and 4.

Forming of the outer body 2 is performed by means of a foaming mould M constituted, in a generally conventional way, by two separable half-moulds A and B of which the first is provided, according to the invention, with a seat S having a shape complementary to that of the pillow element 3. This seat S is delimited by a thin perimetral lateral wall P whose height is however less than the height of the peripheral lateral wall 12 of the pillow element 3. In other words, the depth of the seat S is less than the thickness of the pillow element 3, and is also less than the length of the perimetral edge 14, folded against the lateral wall 12 of the pillow element 3, of the flexible sheet 4. The seat S is surrounded by an annular channel C, separated from this seat S by means of the wall P, which defines with the cavity D of the other half-mould B the shape of the outer body 2. The first step of the method consists of producing, in a further suitable mould not shown since quite conventional, the pillow element 3.

Then the flexible upholstery sheet 4 is simply laid onto the front wall 13 of the pillow element 3, such as diagrammatically depicted in FIG. 3, and the pillow element 3 is thus introduced into the seat S, with its front wall 13, and the flexible sheet 4 laying thereon, placed against the bottom of the seat S. Following introduction, the lateral wall 12 of the pillow element 3 bears against the wall P, and the perimetral edge 14 of the flexible sheet 4 is folded and clamped against the lateral wall 12, by the lateral wall P, such as depicted in FIG. 4. The mould M is thus closed, bringing together the half-moulds A and B, whereby the pillow element 3 will then act as an insert within the mould M itself. Due to the fact that the depth of the seat S is lower than the thickness of the pillow element 3, the portion of the latter corresponding to the rear wall 11 and to its adjacent areas of the lateral wall 12, as well as the end border 14a of the perimetral edge 14 of the flexible sheet 4, project into the cavity D of the half-mould B, such as shown in FIG. 4. The last step consists of foaming the plastic material into the cavity of the mould M so as to form the outer body 2, such as also depicted in FIG. 4. Following this step the rear wall 11 and the lateral wall 12 of the pillow element 3 are rigidly joined by chemical-thermal adhesion respectively to the bottom wall 8 and to the corresponding areas of the lateral wall 9 of the recess 7 of the outer body 2 thus formed, while simultaneously the end border 14a of the perimetral edge 14 of the flexible sheet 4 is fixedly incorporated within the area of the lateral wall 9 of the outer body 2 which is located immediately behind the perimetral gap 15, formed following the foaming step by the perimetral wall P, such as shown in FIG. 5. Accordingly with one single step, i.e. foaming of the outer body 2, both forming and permanent joining thereof with the pillow element 3 are performed, together with permanent joining of the flexible sheet 4 to the pillow element 3. Actually, incorporation of the end border 14a of the perimetral edge 14 of the flexible sheet 4 within the lateral wall 9 of the outer body 2 makes, without any need of bonding or similar additional operations, this flexible sheet 4 perfectly adherent to the front wall 13 and to the portion 12a of the lateral wall 12 of the pillow element 3.

Figure 6:
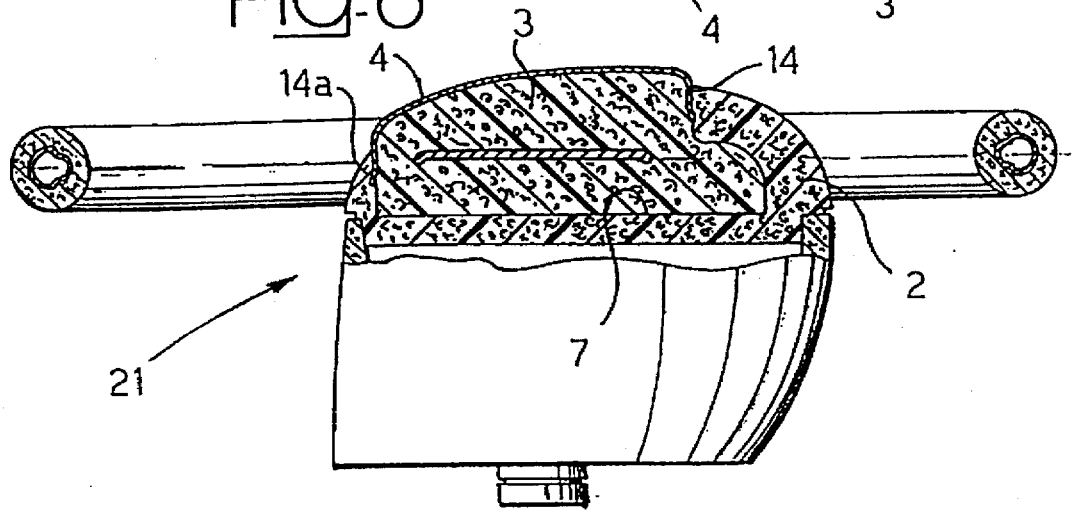
FIG. 6 is a view similar to FIG. 2 showing a steering wheel also produced according to the manufacturing method of the invention.
Figure 7:
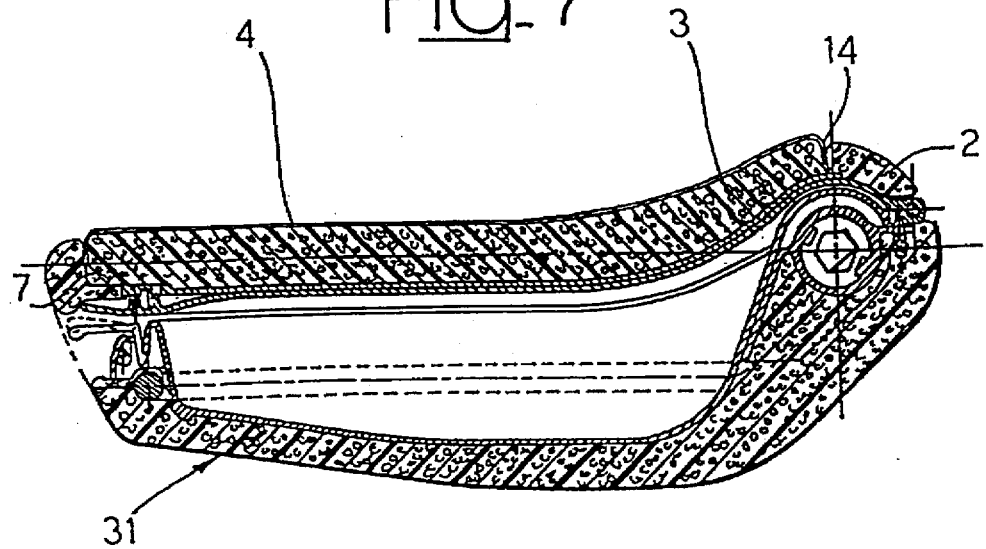
FIG. 7 is a view similar to FIGS. 2 and 6 showing an armrest for motor vehicle seats also produced according to the manufacturing method of the invention.

FIGS. 6 and 7 show a steering wheel 21 and a seat armrest 31 for motor vehicles, respectively, also comprising an outer foamed body 2, an inner pillow element 3 and a flexible lining sheet 4, produced and joined to one another by the same manufacturing method disclosed in the above with reference to the headrest 1. The parts of the steering wheel 21 and of the armrest 31 similar to those disclosed in the above with reference to the headrest 1 are indicated by the same numeral references.

Naturally the details of construction and the embodiments may be widely varied with respect to what has been disclosed and illustrated, without thereby departing from the scope of the present invention, such as defined in the appended claims.

What is claimed is:

1. A method for the manufacturing of a motor vehicle component comprising an outer body formed by in-mould foaming of a relatively soft plastic material and having a front recess with a lateral wall, an inner pillow element made of moulded plastic material which is relatively more rigid and having a peripheral lateral wall, said inner pillow element being secured in correspondence of said front recess of the outer body so as to expose a front surface thereof delimited by said peripheral lateral wall, and a flexible upholstery sheet fixed on said front surface and on at least part of said peripheral lateral wall of the pillow element and having a perimetral edge, comprising the following steps:

forming said pillow element, laying said flexible upholstery sheet onto said front surface of the pillow element so that said perimetral edge of said flexible sheet extends beyond said front surface of the pillow element, providing a foaming mould having a seat with a perimetral lateral wall, said seat having a shape complementary to that of said pillow element and a depth lower than the height of said peripheral lateral wall of the pillow element, said seat having a bottom surface, introducing said pillow element with said flexible sheet into said seat of the foaming mould, so that said flexible sheet is placed against said bottom surface of said seat and said lateral wall of the pillow element with said perimetral edge of the flexible sheet folded thereagainst and partially projecting outwardly of said seat of said mould beyond said wall, feeding said plastic material into said mould and foaming said plastic material to form said outer body around said seat, so as to secure said outer body simultaneously to said pillow element and to said perimetral edge of said flexible sheet with said perimetral edge of said flexible sheet incorporated within the lateral wall of the recess of the outer body adjacent a perimetral gap formed between the outer body and the pillow element.

2. Method according to claim 1, wherein a rigid framework is incorporated within said outer body upon formation thereof.

3. Method according to claim 1, wherein that said motor vehicle component is a headrest.

4. Method according to claim 1, wherein that said motor vehicle component is a steering wheel.

5. Method according according to claim 1, wherein that said motor vehicle component is an armrest.

* * * * *